United States Patent [19]
Masuda

[11] Patent Number: 5,829,401
[45] Date of Patent: Nov. 3, 1998

[54] LUBRICATION SYSTEM FOR TWO-CYCLE ENGINE

[75] Inventor: Tatsuyuki Masuda, Iwata, Japan

[73] Assignee: Yamaha Hatsudoki Kabushiki Kaisha, Iwata, Japan

[21] Appl. No.: 549,175

[22] Filed: Oct. 27, 1995

[30] Foreign Application Priority Data

Oct. 27, 1994 [JP] Japan ..................... 6-263522

[51] Int. Cl.⁶ ................ B60K 5/04; F01M 1/02; F02N 11/00
[52] U.S. Cl. ................ 123/179.25; 123/73 AD; 123/196 R; 123/196 AB; 180/297
[58] Field of Search ............. 123/196 R, 196 AB, 123/196 M, 179.1, 179.25, 73 AD; 180/291, 297

[56] References Cited

U.S. PATENT DOCUMENTS

| | | | |
|---|---|---|---|
| 3,304,927 | 2/1967 | Gorski | 123/179.1 |
| 3,598,093 | 8/1971 | Tanaka | 123/179.25 |
| 5,390,635 | 2/1995 | Kidera et al. | 123/73 AD |
| 5,517,959 | 5/1996 | Kato et al. | 123/196 AB |
| 5,537,959 | 7/1996 | Ito | 123/73 AD |

FOREIGN PATENT DOCUMENTS

| | | |
|---|---|---|
| 0368430 | 5/1990 | European Pat. Off. |
| 0428418 | 5/1991 | European Pat. Off. |
| 0555827 | 8/1993 | European Pat. Off. |
| 2169088 | 9/1973 | France |
| 2444813 | 7/1980 | France |

OTHER PUBLICATIONS

Patent Abstracts of Japan, vol. 7, No. 257 (M256), Nov. 16, 1983 for JP 58-139819 (Ikenotani et al), Aug. 19, 1983.

*Primary Examiner*—Andrew M. Dolinar
*Attorney, Agent, or Firm*—Knobbe, Martens, Olson & Bear LLP

[57] ABSTRACT

An oil-metering system for an internal combustion engine including an oil tank for supplying oil to the lubrication areas of the engine. The plurality of individual oil supply conduits are provided for supplying oil to lubrication areas. A pumping and control means individually meters oil supplied by the oil tank and supplies to the lubrication areas or returns oil to the oil tank. A single oil-return manifold connects the pumping and control means by a plurality of individual return conduits. The oil return manifold and pumping and control means are commonly mounted in close proximity to each other in order to reduce the length of the return conduits.

20 Claims, 11 Drawing Sheets

LUBRICATION SYSTEM FOR TWO-CYCLE ENGINE

BACKGROUND OF THE INVENTION

This invention relates to lubricant control and more particularly to an improved lubrication system for an internal combustion engine.

The lubrication of an internal combustion engine is particularly important, as should be readily apparent. The problems of providing adequate lubrication during the widely varying engine speeds and loads encountered during normal operation, particularly in automotive applications, is particularly difficult. This problem is particularly acute in connection with two cycle engines since the spent lubricant is discharged with the exhaust gases from the engine. Hence, if excess lubricant is employed, the exhaust emission problems can become acute and particulates in the exhaust gases may become objectionable in the form of smoke. However, if inadequate lubrication is supplied, then disastrous results will occur.

It has, therefore, been proposed to eliminate the previously proposed method of lubricating two cycle engines by mixing lubricant with their fuel to provide positive lubricating systems that deliver lubricant directly to the engine for its lubrication. These systems may either inject lubricant into the intake passage or may deliver the lubricant directly to the components of the engine to be lubricated. Although these systems have particular advantages, they do present substantial problems.

Specifically, the amount of lubricant required for the engine per cycle varies substantially with load and speed and it is difficult to provide adequate and yet not excessive lubricant under all running conditions. Also, with internal combustion engines there are a wide number of components that must be lubricated, even with two cycle engines. The lubricant requirement for the different elements of the engine do not vary in the same proportion, however, with respect to engine speed and load. Most lubricating systems proposed do accommodate variations in the amount of lubricant supplied to the components of the engine, but they cannot cope with the fact that the lubricant requirements for the various components do not vary in the same proportion in response to change in the engine running conditions.

The pump runs constantly while the engine is running so oil is either delivered directly by the selector valves to the lubrication areas of the engine or returned to the oil tank for recirculation.

The pumping and control means delivers oil to the oil tank through delivery conduits to an oil-return manifold. The oil-return manifold receives the multiple delivery conduits through multiple inlets and delivers oil through a single outlet to the oil tank. The pumping and control means and oil returned manifold are mounted proximate to each other so that shorter rigid delivery conduits may be provided. Shorter rigid delivery conduits reduce leaking and wear in the conduits.

A still further object of this invention is to provide an improved lubrication system for lubricating the various components of an engine which will ensure that all components receive the proper amount of lubricant regardless of the running condition.

Prior inventions that vary the amount of lubrication to the various components of the engine depending on the running condition require multiple oil pumps that are turned on and off in order to deliver the proper amount of oil to the lubrication areas.

The oil-metering system of the present invention eliminates the need to provide multiple oil pumps that must be turned on and off in order to deliver the proper amount of oil to the lubrication areas. A pumping and control means includes a pump and multiple selector valves that individually meter oil supplied from an oil tank by selectively delivering the proper amount of oil to the lubrication areas of the engine or recirculating the oil back to the oil tank.

It is, therefore, a further object of this invention to provide an oil-metering system that provides the required amount of oil to the lubrication areas or returns the oil to an oil supply tank.

In internal combustion engines of the past starter motors have been provided adjacent the engines to be engaged with a of from the engine. The position of the starter motor next to the engine has caused heating problems for the starter motor. The location of the starter motor also has made it difficult to service the starter motor because of its non-accessibility.

It is therefore a further object of this invention to provide a starter motor that is located relative to the engine so as to be easily accessible for service and also located in a position relative to the engine so as to be cooled by air coming into the engine compartment to cool the engine.

SUMMARY OF THE INVENTION

A first feature of the present invention is an oil-metering system for an internal combustion engine that includes an oil tank for supplying oil to the lubrication areas of the engine. The oil-metering system also includes a plurality of individual oil supply conduits for supplying oil to the lubrication areas of the engine. A pumping and control means individually meters oil supplied by the oil tank and supplies oil to the lubrication areas or returns oil to the oil tank. A single oil-return manifold is connected to the pumping and control means by a plurality of individual return conduits. The oil-return manifold and pumping and control means are commonly mounted in close proximity to each other so that the length of the return conduits is reduced.

It is a second feature of this invention to provide a starter motor arrangement for an internal combustion engine wherein the starter motor is located relative to the engine so that it is easily accessible and is cooled by the atmospheric air that is brought into the engine compartment to cool the engine.

DETAILED DESCRIPTION OF THE PREFERRED EMBODIMENT

Figure 1:
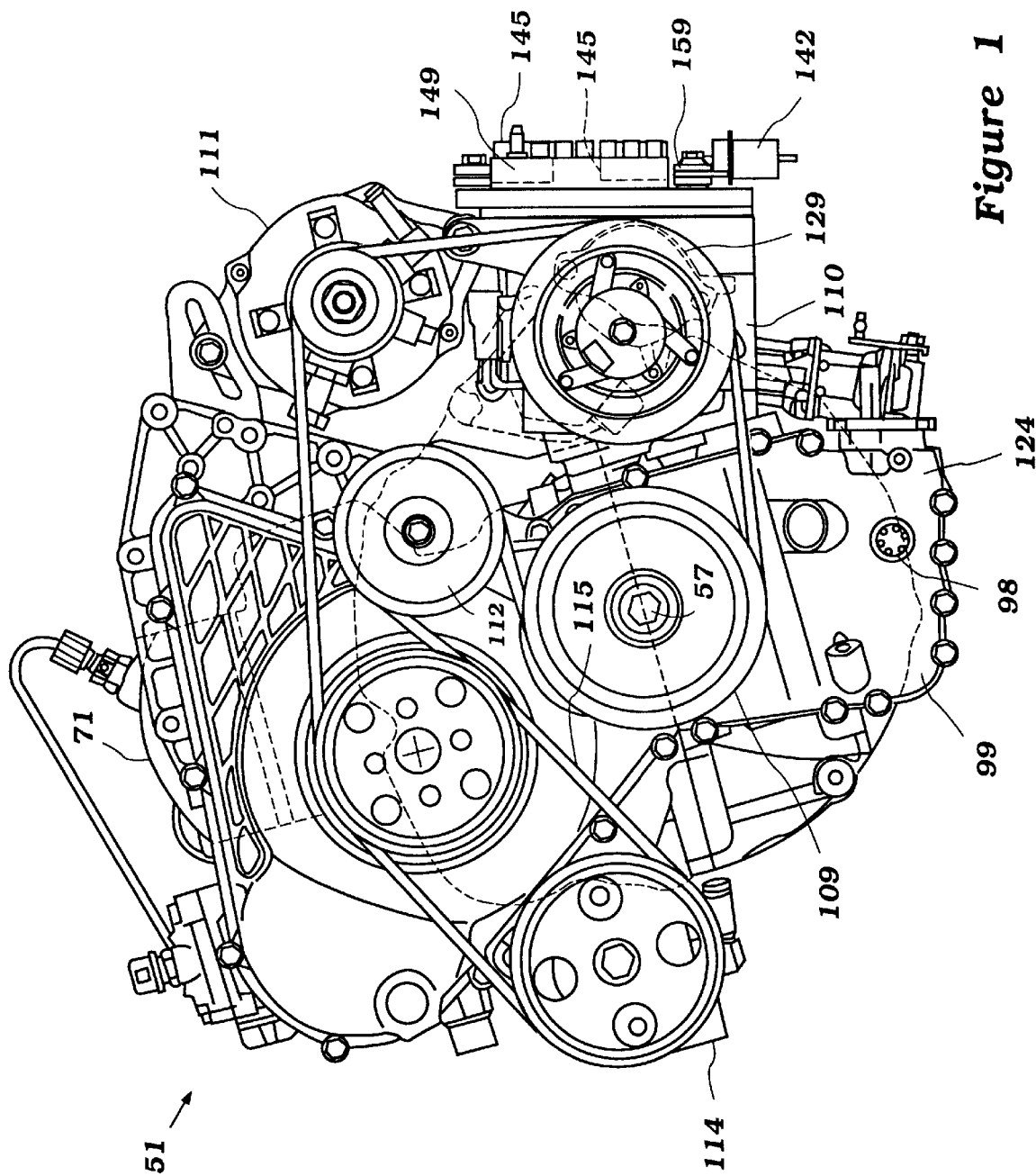
FIG. 1 is a front elevational view of the present invention applied to an automotive diesel engine.
Figure 2:
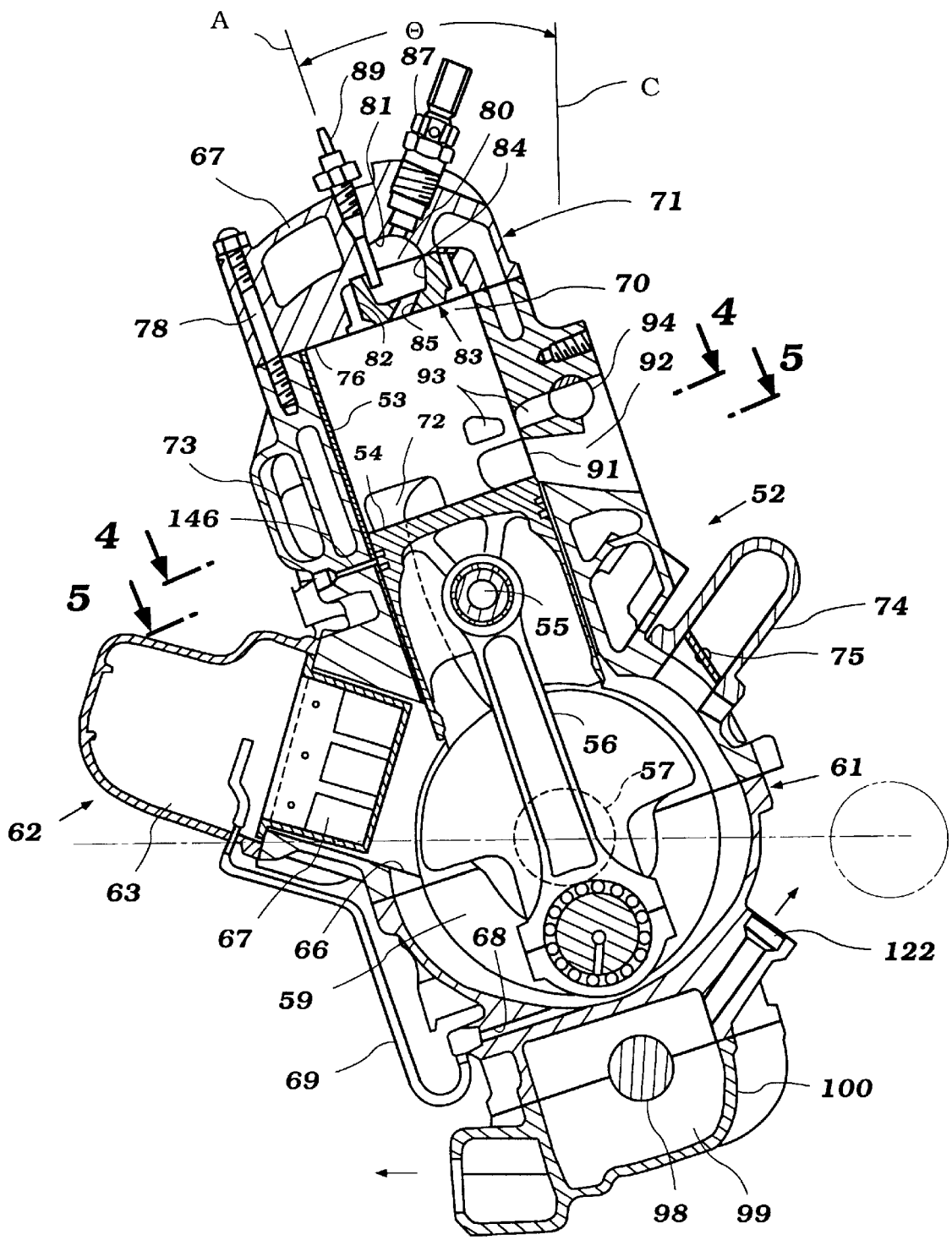
FIG. 2 is a cross-sectional view taken along a plane perpendicular to the crankshaft and generally along the line 2—2 of FIG. 3.
Figure 3:
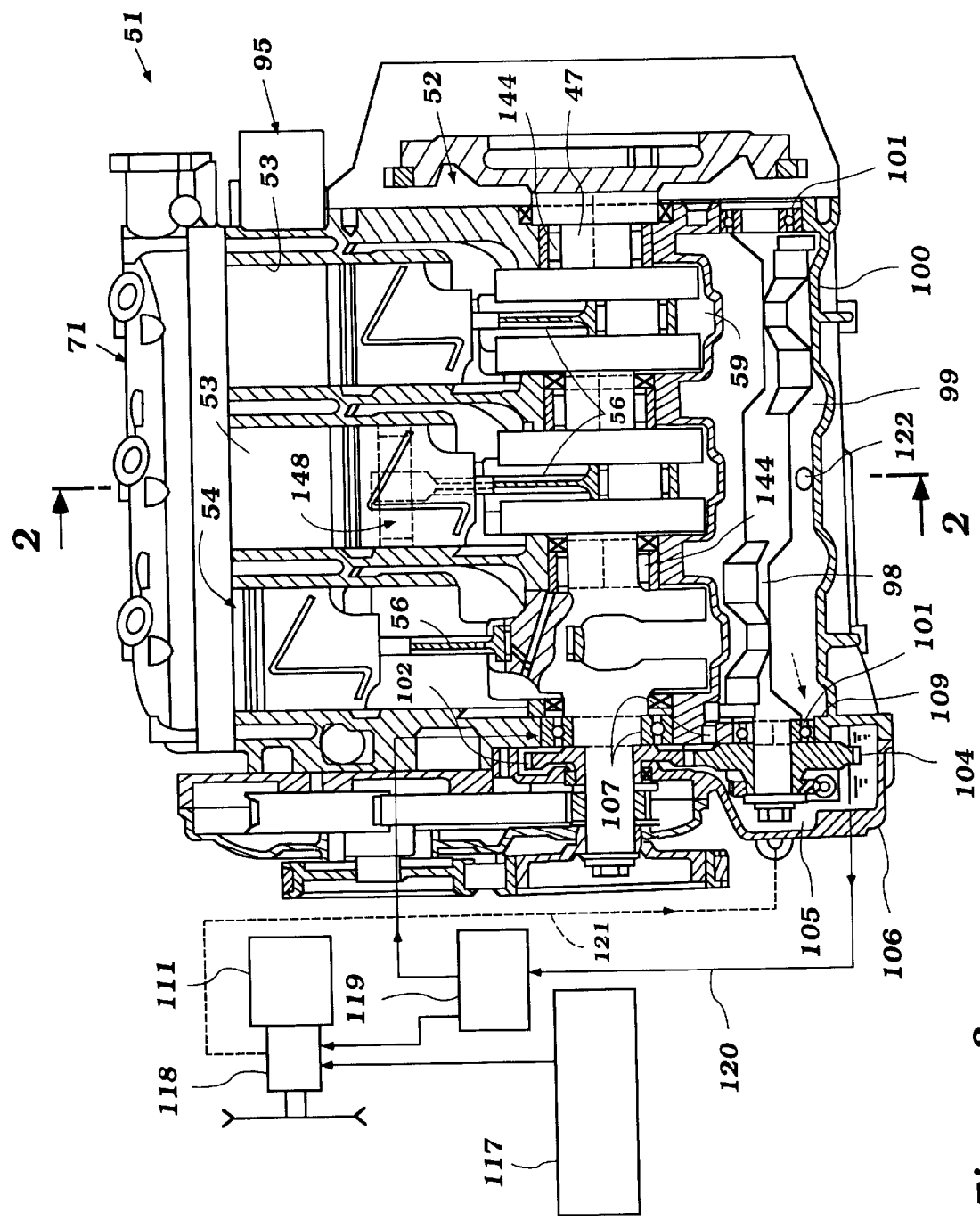
FIG. 3 is a side elevational view, on a scale reduced from that of FIG. 2, with a portion of the engine broken away and shown in section.

Referring now in detail to the drawings and initially to of FIGS. 1 through 3, an internal combustion engine constructed in accordance with an embodiment of the invention is identified generally by the reference numeral 51. The engine 51 is depicted as being of a three-cylinder in-line type but will be readily apparent to those skilled in the art that the invention can be applied to engines having other cylinder numbers and other cylinder configurations. In the illustrated embodiment, the engine 51 operates on a two-cycle, crankcase compression, diesel principal. Again, however, it will be readily apparent to those skilled in the art how the invention can be employed with engines operating on different cycles and with different combustion techniques (diesel or spark ignition).

The engine 51 includes a cylinder block assembly 52 in which three aligned cylinder bores 53 are formed in any known manner. The cylinder block 52 is disposed so that it is inclined from the vertical and in a rearward direction as shown in FIG. 1 and 2. This orientation is particularly advantageous when employed in conjunction with a front engine motor vehicle having a transverse engine orientation wherein the cylinder block 52 will be inclined slightly rearwardly.

A plurality of pistons 54 reciprocate within the cylinder bores 53 and are connected by means of piston pins 55 to the upper or small ends of connecting rods 56. Each connecting rod 56 has its lower or big end journaled on a respective throw on crankshaft 57 that is rotatably journaled in a known manner within a crankcase chamber 59 formed at the lower end of the cylinder block 52. This crankcase chamber 59 may be formed in part by the skirt of the cylinder block 52 and by a crankcase member 61 that is affixed in any known manner to the cylinder block 52. As is well known in this art, the crankcase chambers 59 associated with each of the cylinder bores 53 may be sealed from each other in a known manner so as to facilitate the two cycle crankcase compression operation of the engine 51.

An intake air charge is delivered to the crankcase chamber 59 through an induction system, indicated generally by the reference numeral 62. This induction system includes an intake manifold 63 that draws an air charge through an air inlet 160 and an air filter and silencer assembly 161. Air is then delivered to each of a plurality of intake passages 64 formed at the lower end of the cylinder block 52 and which communicate with the crankcase chambers 59. Reed type valve assemblies 65 are provided in the intake passages 64 so as to permit the flow of the intake charge into the crankcase chambers 59 when the pistons 54 are moving upwardly in the cylinder bores 53 and for precluding reverse flow when the pistons 54 are moving downwardly so as to compress the charge in the crankcase chambers 59.

Oil is added to the air change in the intake manifold by a return hose 157. Each crank chamber 59 communicates with the intake manifold 63 by a return path 157 connecting the bottom of each crank chamber 59 to a hose 158. The return path 157 ensures that the lubricating oil accumulated in the crank chamber 59 may be returned into the intake manifold 63.

The charge which is drawn into the crankcase chambers 59 and compressed therein is then transferred to a main combustion chamber, indicated generally by the reference numeral 66 and formed by the cylinder bore 53, piston 54, and by a cylinder head assembly 67 that is affixed to the cylinder block 52 in a manner which will be described. This transfer takes place through a pair of side scavenge passages 68 and a center scavenge passage 69 for each of the cylinder bores. The scavenge passages 68 and 69 terminate in respective scavenge ports that are formed in the cylinder block and which communicate with the cylinder bore 53 in a well known manner.

Figure 4:
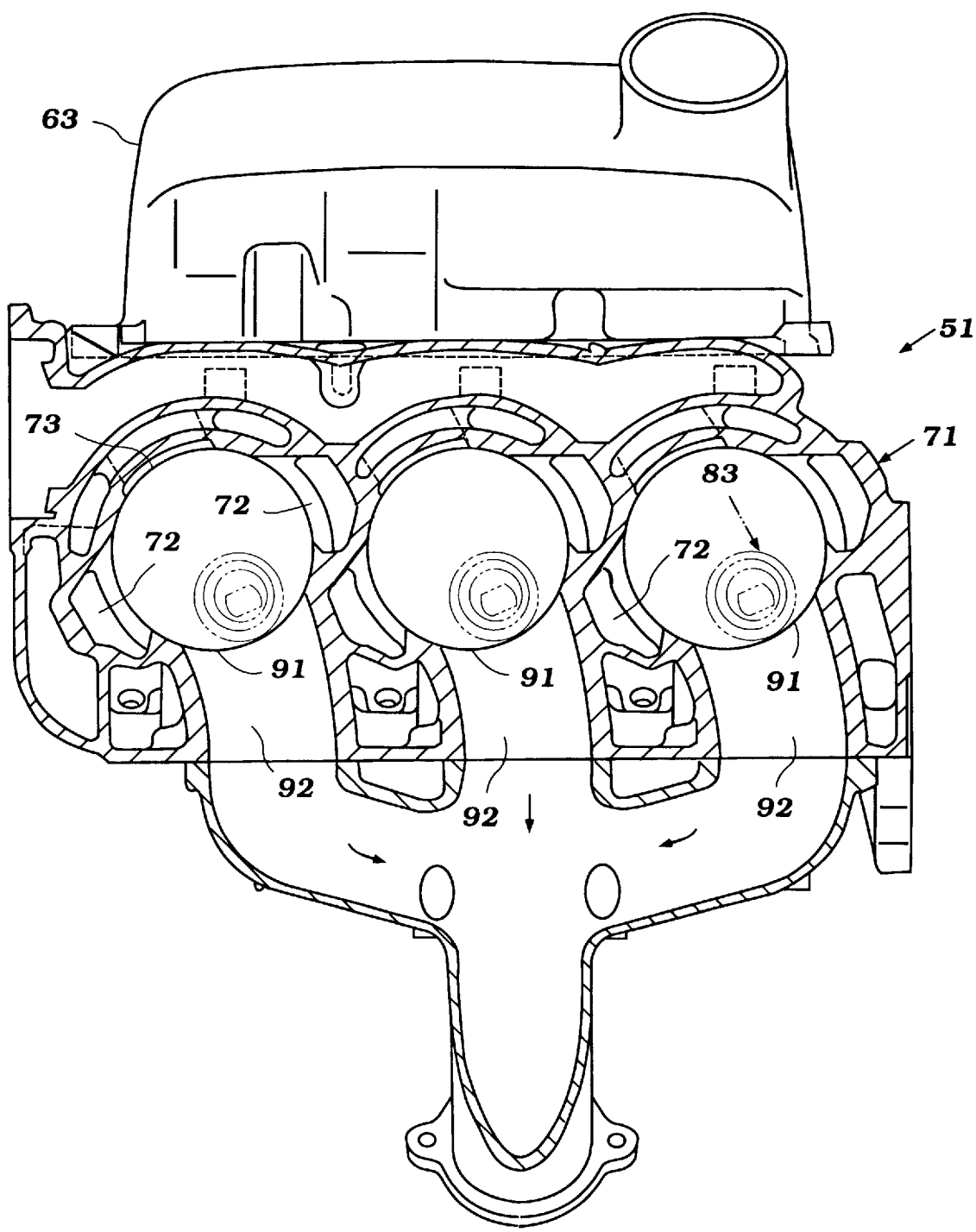
FIG. 4 is a cross-sectional view taken along the line 4—4 of FIG. 2.

As best shown in FIG. 4, the engine 51 may also be provided with an arrangement for reducing the scavenging airflow under some conditions, and this is accomplished by providing a manifold 97 that communicates the crankcase chambers 59 with each other when control valves 98 are open. When these control valves 98 are open, the pressure in the crankcase chambers 59 will be slightly reduced, and the amount of scavenging airflow will be reduced. This type of construction is now known in the art.

The cylinder head assembly 67 is comprised of a main cylinder head casting member, indicated generally by the reference numeral 71 and which may be formed from a lightweight, highly heat conductive material such as aluminum or an aluminum alloy. Conveniently, the main cylinder head member 71 may be formed by casting. The cylinder head member 71 has a lower surface 72 that is in sealing relationship with the cylinder block 52 around the cylinder bores 53. A cylinder head gasket (not shown) may be interposed between the cylinder head lower surface 72 and cylinder block 52 for sealing purposes, as is well known in this art. Threaded fasteners 73 affix the cylinder head member 71 to the cylinder block 52.

The cylinder head surface 72 surrounds a combustion chamber forming surface 74 which may, in fact, be coextensive with the sealing surface 72. This surface 74 forms with the cylinder bore 53 and heads of the pistons 54, the main combustion chambers 66 before referred to.

A precombustion chamber 80 is formed in the cylinder head assembly 71 in a manner now to be described. This precombustion chamber 80 is offset to one side of the cylinder bore 53 from the center of the cylinder bore 53. In a preferred arrangement, this offset is toward the side of the cylinder bore 53 away from the center scavenge passage 73. This precombustion chamber 80 is formed by a spherical segment 81 formed integrally with the cylinder head member 76 and at the base of a counterbore 82.

An insert piece, indicated generally by the reference numeral 83 is positioned within this counterbore 82 and affixed therein. The insert piece 83 is formed preferably from a heat resistant steel, for example a steel designated as SUH 3 according to the Japanese Industrial Standards (JIS). This material has a lower heat conductivity than the aluminum of the main cylinder head member 76 and a lower thermal expansion than this main cylinder head member 76.

The insert piece 85 is formed with a recessed area 84 which has a surface of a segment of a cone with the upper diameter thereof being equal to the spherical diameter of the spherical portion 81 of the main cylinder head member 76. The lower diameter may have any desired shape and thus the insert piece section 83 and cylinder head section 71 form the precombustion chamber volume 80 previously described.

A transversely extending throat 85 is formed in the lower end of the insert piece 83 and communicates the pre-chamber volume 80 with the main combustion chamber 70. This throat 85 is directed so that it will terminate substantially at the center of the cylinder bore 53 and direct the charge issuing therefrom downwardly into the cylinder bore 53 toward the scavenge port formed at the end of the center scavenge passage 75.

The insert piece 81 has a cylindrical outer surface that is complementary in diameter to the cylinder head counterbore 82. The insert piece 83 terminates in a lower surface 86 through which the throat 85 extends.

Figure 11:
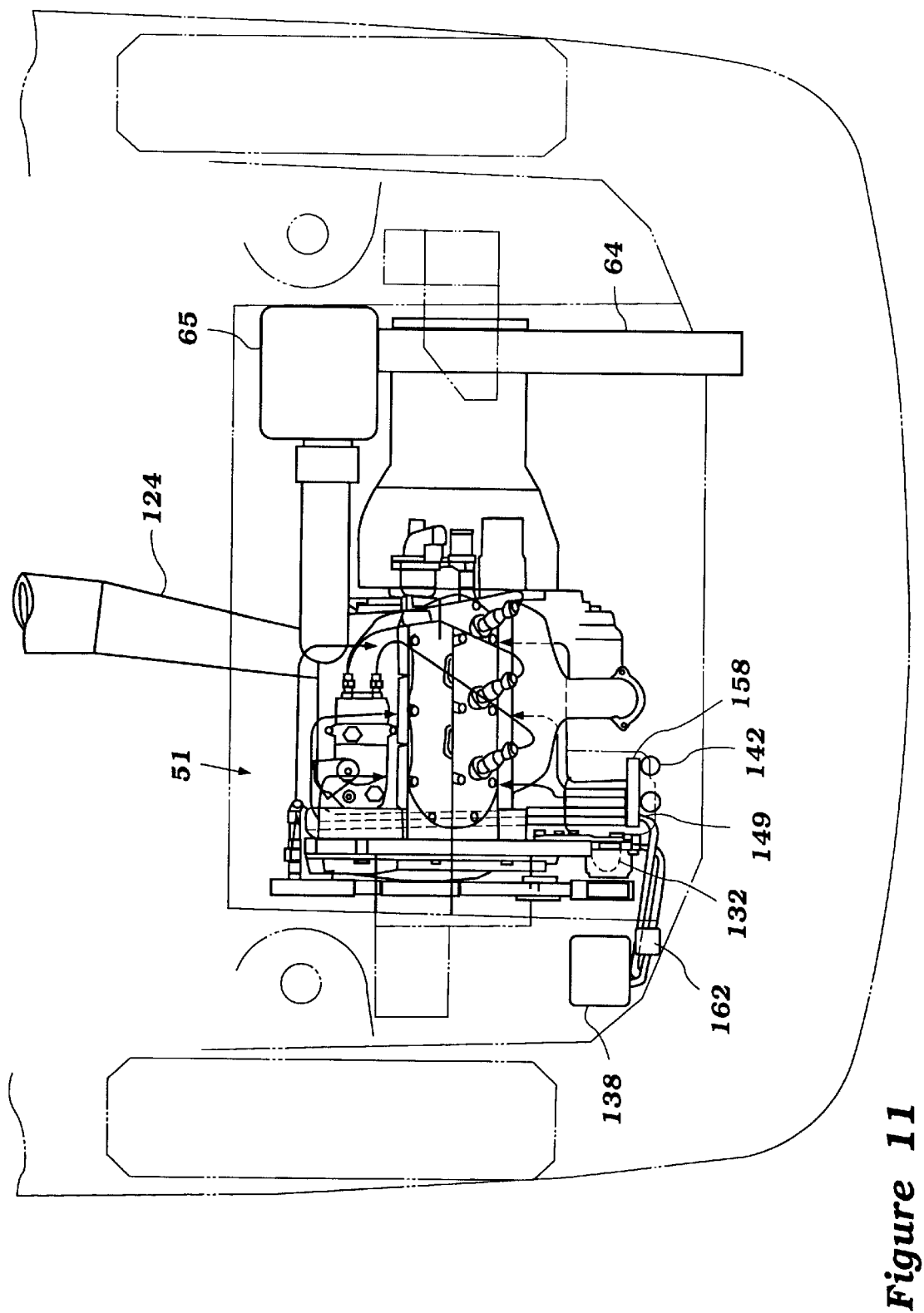
FIG. 11 is a partial front view of a motor vehicle powered by an engine constructed in accordance with the present invention with the other portions of the vehicle shown in phantom.

A fuel injector 87 is mounted in the cylinder head member 76 and is supplied fuel by fuel supply 88 through a plurality of conduits, as best seen in FIG. 11. Fuel injectors 87 spray into the precombustion chamber 80 and through the throat 85 into the main chamber 70. To assist in the initiation of starting and combustion, a glow plug 89 may be positioned with its tip 90 in the precombustion chamber 80.

As the piston 54 approaches the top dead center position, and as the pressure rises in both the pre-chamber 80 and main chamber 70, fuel is injected by the injector 87 and, due to the high temperature in the pre-chamber, will ignite, burn, and expand. This expansion occurs also through the throat 85 so as to fire the charge in the main chamber 70 and complete the combustion and the driving of the piston 54 downwardly.

As the piston 54 is driven downwardly, an exhaust port 91 formed at the cylinder bore end of a main exhaust passage 92 extending through the cylinder block 52 will open and the exhaust gases can be discharged to the atmosphere through an exhaust system.

If desired, there may be provided an auxiliary exhaust passage 93 in which an exhaust control valve 94 is positioned for controlling the effective compression ratio of the engine 51, as is known in this art. The auxiliary exhaust passage 93 and main exhaust passage 92 are formed diametrically opposite the center scavenge passage 73.

Figure 5:
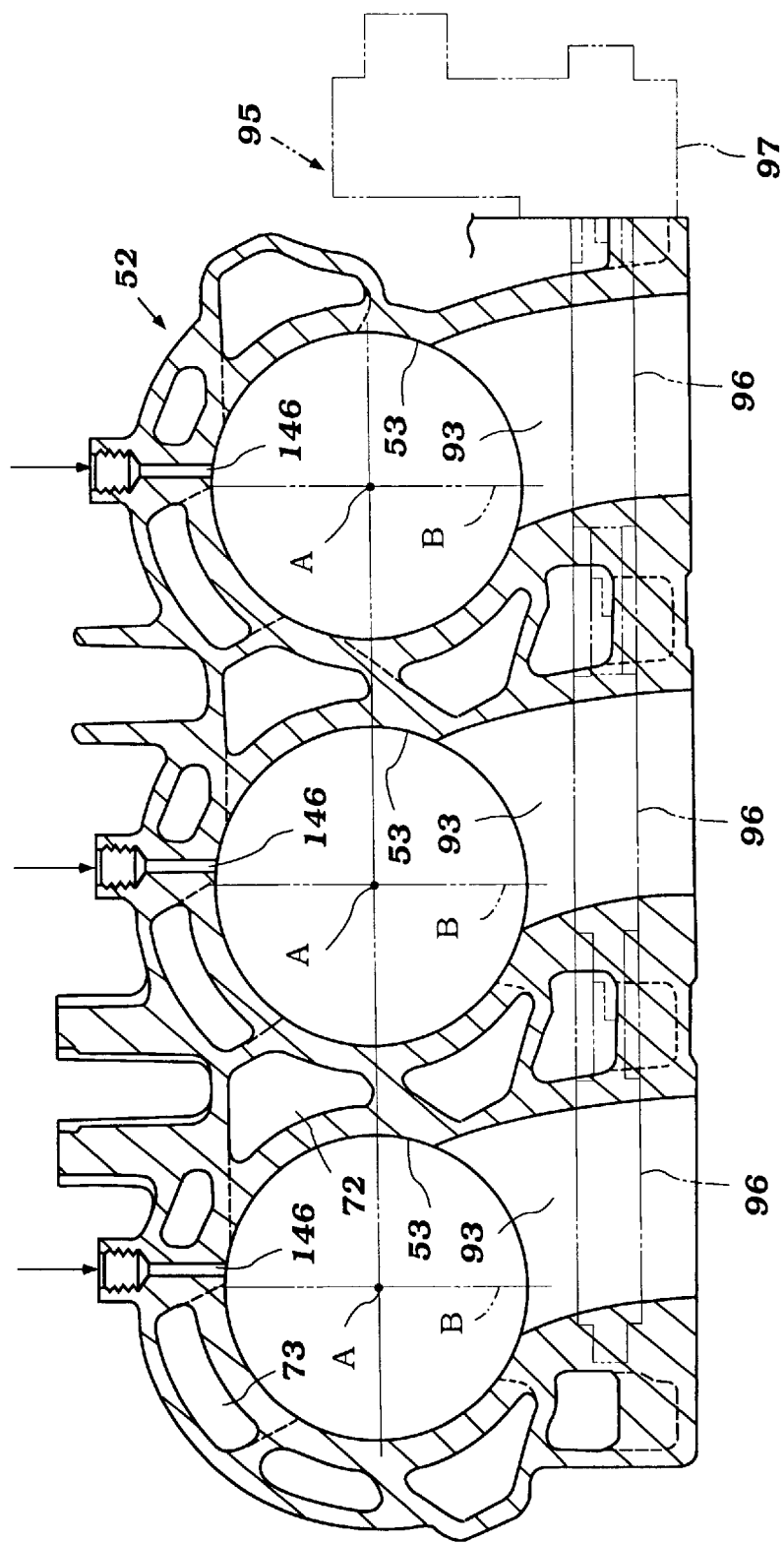
FIG. 5 is a cross-sectional view taken along the line 5—5 of FIG. 2.

Each auxiliary exhaust passage 93 is opened or closed under control by an exhaust control system 95, as best seen in FIG. 5. The control system 95 is used for varying the exhaust timing and compression ratio, and is inserted and disposed to cross the auxiliary exhaust ports 93. The control system 95 is provided with three exhaust control valves 96 across each auxiliary exhaust passage 93 connected to each other by a driving shaft. Driving mechanism 97 operates the driving shaft for opening and closing the valves 96. Each exhaust control valve 96 comprises a round bar having an arcuate valve portion formed thereon.

Now with reference to FIGS. 2 and 3, a balance shaft, indicated generally by the reference number 98, is rotatably journaled within a balance shaft chamber 99 formed beneath the crankcase chambers 59 and is defined by the crankcase member 61 and a cover member 100 which is affixed thereto. The balance shaft 98 is rotatably journaled in a pair of spaced apart bearings 101 and rotates about an axis that is parallel to an axis of the crankshaft 57, and at the same speed but in the opposite direction. Due to the fact that the engine 51 is a two-cycle, crankcase compression type, it is possible to put the balance shaft 98 substantially beneath the crankshaft 57 without adding significantly to the height of the engine 57.

The crankshaft 57 includes a driving gear 102 that is affixed to the end of the crankshaft 57 opposite of a flywheel assembly 103, to be described. Driving gear 102 is in meshing engagement with a driven gear 122 keyed to the balance shaft 99. Balance shaft 99 has formed integrally therewith three eccentric masses, one for each cylinder 53 of the associated engine. As is well known, the rotation of the eccentric masses will cause the balancing of certain forces on the engine.

The gears 102 and 104 are located in a gear chamber 105 formed by the ends of the cylinder block 52, crankcase member 61 and balance cover 100, along with a gear cover 106. The gear chamber 105 communicates with the balance chamber 99 through upper and lower communication holes 107 and 108, respectively, as seen in FIG. 3.

As shown in FIG. 1, the crankshaft 57 includes a crankshaft drive pulley 109 that drives an air conditioning compressor 110, an alternator 111, an idle pulley 112, a water pump 113 and a power steering pump 114 through a plurality of respective pulleys and a serpentine belt 115. Air conditioning compressor 110 includes a clutch 116 for engaging the air conditioning compressor 110.

Because the engine 51 in a preferred embodiment is a two-cycle, diesel engine, the negative intake pressure for the brake booster vacuum motor 117 is often insufficient. With reference to FIG. 3, the engine 51 is provided with a negative pressure producing vane pump or air compressor 118 coaxial with the alternator 111. Lubricating oil is supplied co the air compressor 118 via an oil pump 119. The supply of lubricating oil is drawn through an oil passage 120 from the gear chamber 105 through a mixture passage 121. A majority of the oil discharged with the air from the air compressor 118 then condenses and joins with the oil in a first and second oil reservoir (not shown). The vaporous mixture still having lubricant remaining therein flows into the balance chamber 99 through the upper communication passage 107. Most of the remaining lubricating oil then condenses and is separated and returned to the oil reservoirs via the lower communication passage 108.

The air substantially separated of lubricating oil, is then supplied from an air discharge port 122 into the intake manifold 63 through a breather hose. The balance chamber 99 thus functions as a breather chamber for separating the oil and air mixture output from the air compressor 118.

Figure 6:
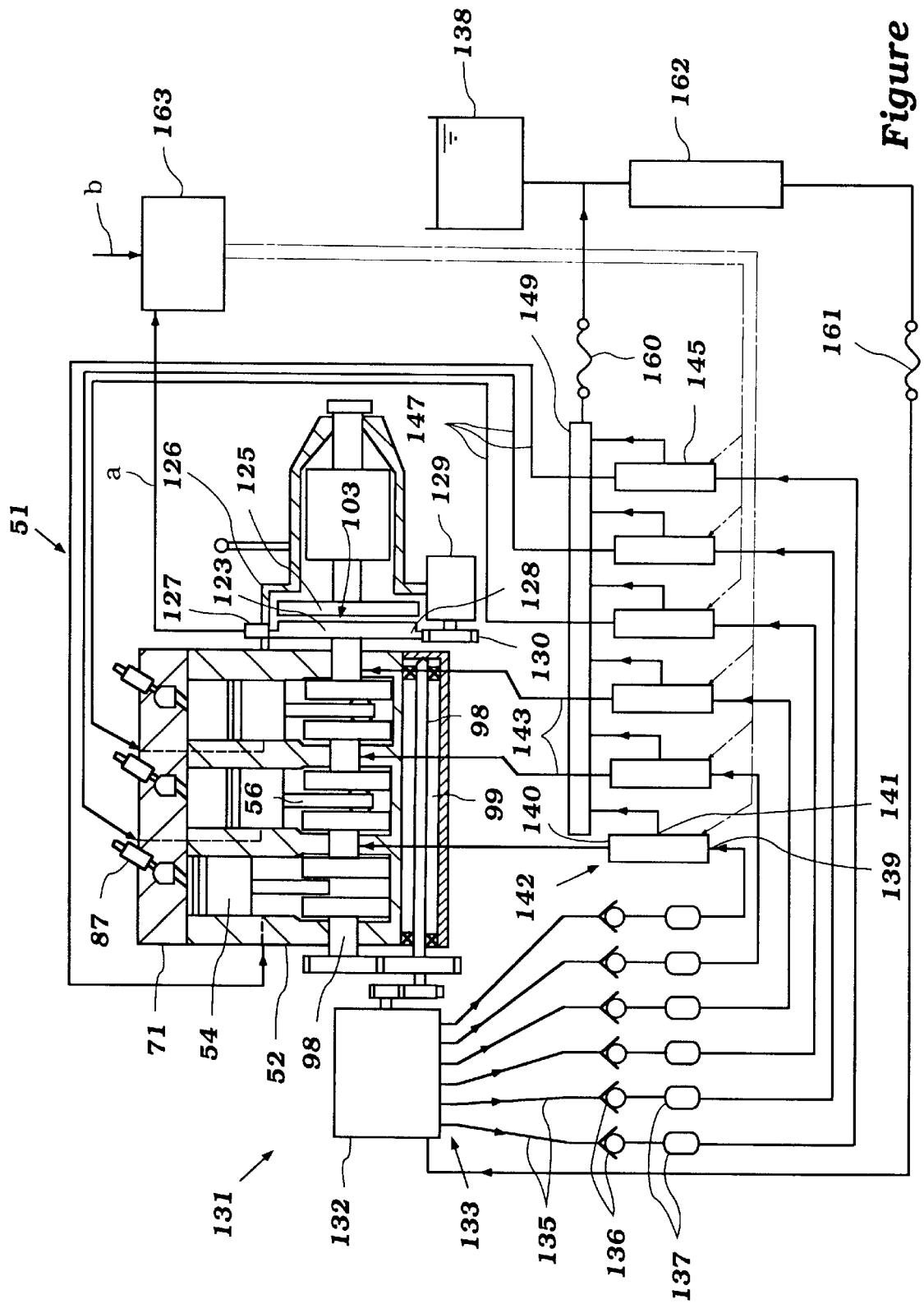
FIG. 6 is a partially schematic cross-sectional view taken through the cylinders of an engine that is adapted to be constructed and operated in accordance with the present invention.

As substantially shown in FIG. 6, at one end of the crankshaft 57 there is disposed a clutch assembly 123 that includes a clutch 124 that drives a transmission 125 in a well known manner. Adjacent the clutch assembly 123, is a flywheel magneto assembly 103, which will now be described. A flywheel 126 is operatively associated with an electrical coil 127 so as to generate an electrical impulse in the coil 127 when the flywheel rotates with the crankshaft 57. The electrical impulse generated corresponds to the rotational speed of the crankshaft 57 of the engine 51. The flywheel 126 includes a ring gear 128 formed at the periphery of the flywheel 126.

The starter motor arrangement of the present will now be described. A starter motor 129 is located adjacent to the clutch assembly 123. The starter motor 129 includes a starter gear 130 operatively engaged with the ring gear 128 of the flywheel 126. The starter motor 129 is positioned between the cylinder block 52 of the engine at an end of an automobile closest to the engine 51. The starter motor 129 is located substantially at the same height as the crankshaft 57 The location of the starter motor 129 allows the motor 129 to be cooled by the atmospheric air brought into the engine compartment to cool the engine 51. Also, the position of the starter motor 129 allows it to be easily accessible for servicing.

The oil-metering system of the present invention will now be described and can best be seen in FIG. 6. A pumping and control means 131 includes an oil pump 132 with a plurality of outlets 133. The outlets 133 are connected to a plurality of selector valves 134 by a corresponding plurality of delivery conduits 135. Disposed within the delivery conduits are one-way valves 136 and oil strainers 137 for preventing oil from flowing back into oil pump 132. Each selector valve 134 meters oil supplied to it and either supplies oil to lubrication areas of the engine 51 or returns oil to an oil tank 138. Selector valves 134 include inlet ports 139, outlet parts 140 and return ports 141. The conduits 138 connect outlets 133 of oil pump 132 to the inlet ports 139 of selector valves 134.

A first series of selector valves 142 supply lubricant at P1 through a first series of individual oil supply conduits 143 to a set of main bearings 144 in which crankshaft 57 is rotatably journaled. A second series of selector valves 145 supplies lubricant to oil passages 146 through a second series of oil supply conduits 147 at P2. The oil supply conduits 143 are connected to the selector valves 134 at outlet ports 140.

Each piston 54 has a pair of oil distributing grooves 148 formed in the skirt portion to uniformly spread oil supplied through oil passages 146 over the piston skirt sliding surfaces. These distributing grooves 148 comprise axially disposed grooves offset circumferentially around each piston 54 so as to remain and register with the oil passages 146 and the cylinder bore 53. These circumferential grooves 148 extend generally perpendicularly to the axis of the pistons 54 and ensure What lubricant is delivered substantially around the entire circumference of the piston skirt.

The provision of the axial grooves 148 ensures that the skirt sliding surfaces of each piston 54 can be lubricated around their circumferences with a smaller number of oil passages. Further, because oil remains in the grooves 162 even when the engine is out of operation for long periods, lubrication can be resumed instantly after restarting the engine.

The oil requirements of the main bearings 144 of the engine are not the same as those for the pistons 54 and these requirements do not vary with load and speed in the same relationship. Hence, the oil-metering system provides the lubrication areas of the engine with different lubricant requirements which vary differently with speed and load.

The selector valves 134 eliminate the need to provide multiple pumps that must be turned on and off by a control unit in order to deliver the proper amount of lubrication to different areas of the engine. The pump 182 runs instantly delivering oil. The selector valves 186 meter this oil to either the engine 51 or the oil tank 138. The pumping and control means may be constructed as one unit or constructed of separated pump and valve elements.

Figure 8:
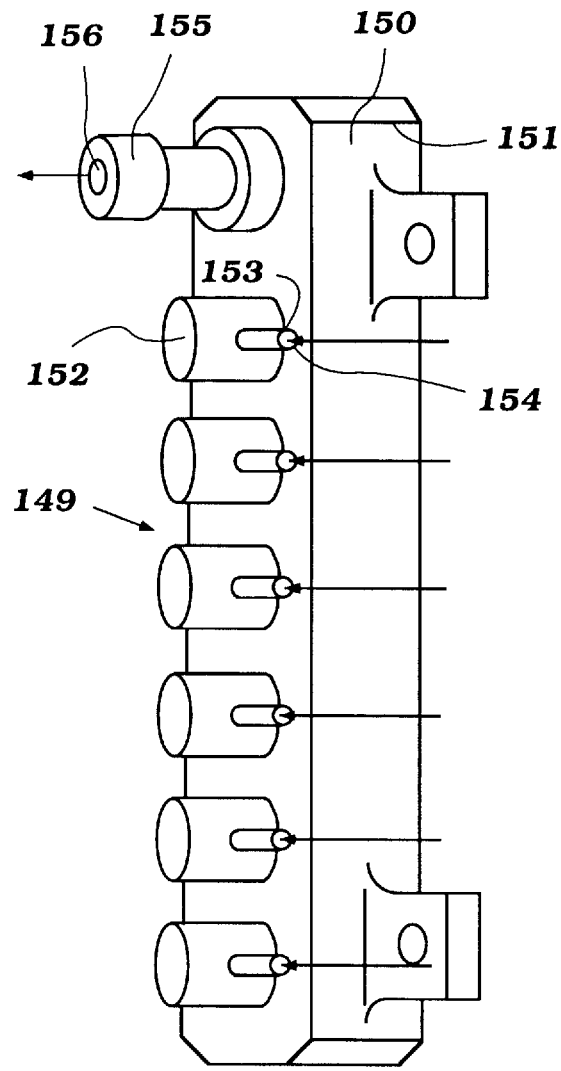
FIG. 8 is a perspective view of the oil-return manifold of the present invention.
Figure 9:
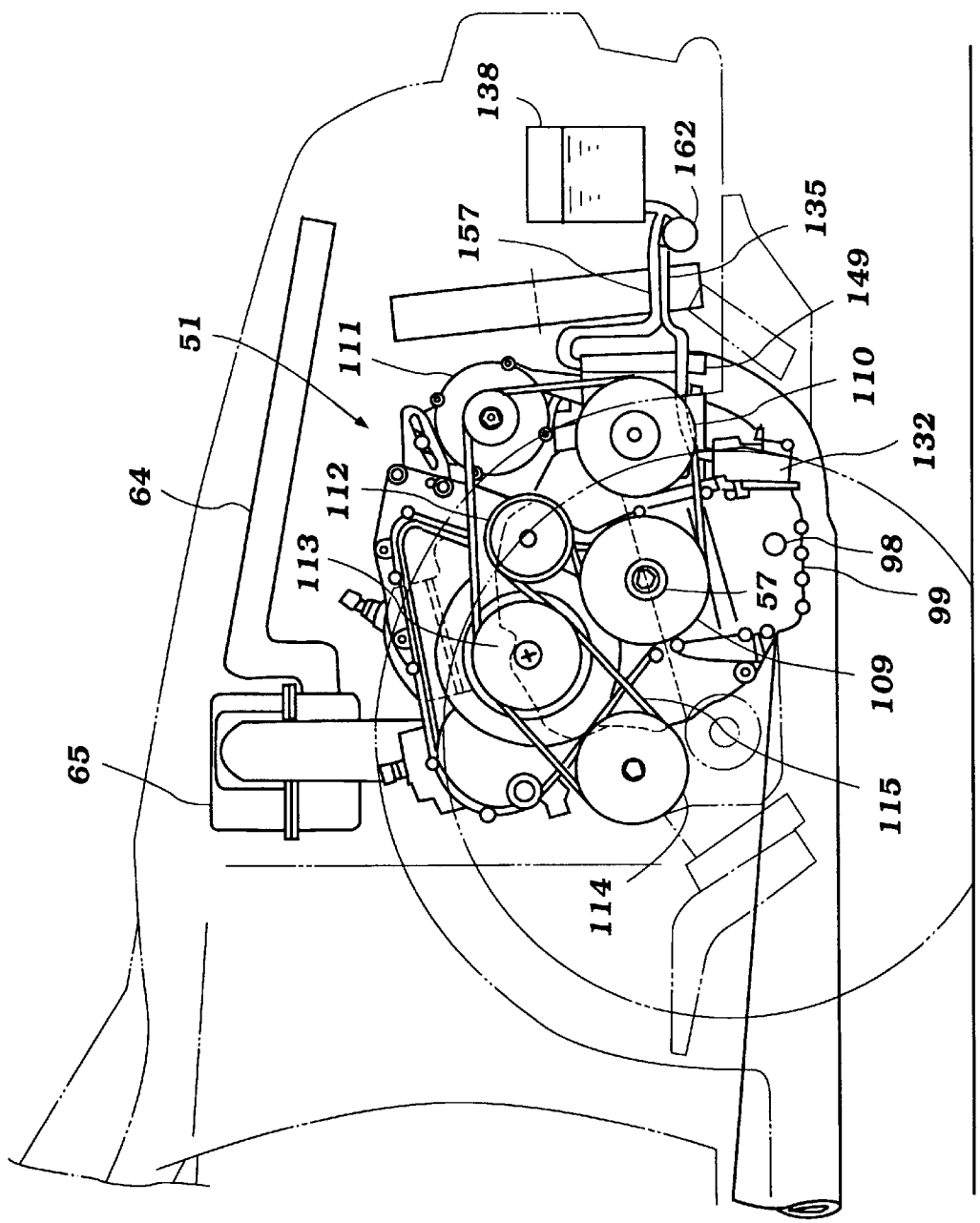
FIG. 9 is a partial side view of a motor vehicle powered by an engine constructed in accordance with the present invention with the other portions of the vehicle shown in phantom.
Figure 10:
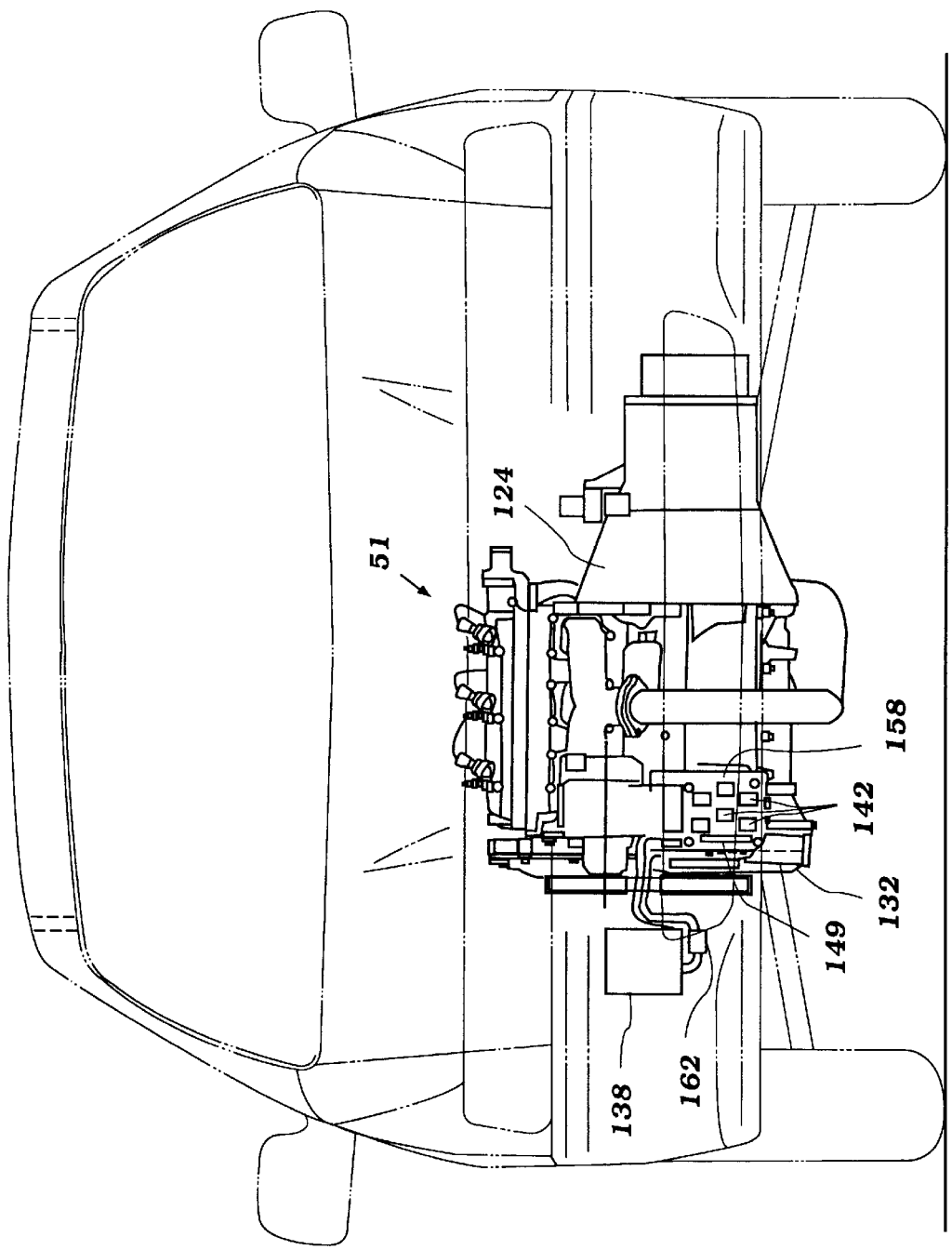
FIG. 10 is a partial front view of a motor vehicle powered by an engine constructed in accordance with the present invention with the other portions of the vehicle shown in phantom.

Depending on the requirements of the engine 51, the selector valves 134 may return oil to the oil tank 138 and recirculate oil back through the system. Oil is returned to the oil tank 138 through a single oil-return manifold 149. Oil-return manifold 149, as best shown in FIG. 8, includes a cover member 150 that defines a manifold chamber 151.

A plurality of inlet heads 152 extend from the cover member 150. Each inlet head 152 is provided with an inlet nipple 153 for receiving oil 154. An outlet nozzle 155 extends from the cover member 150. The outlet nozzle includes an outlet port 156 for delivery of oil to the oil tank 138.

Figure 7:
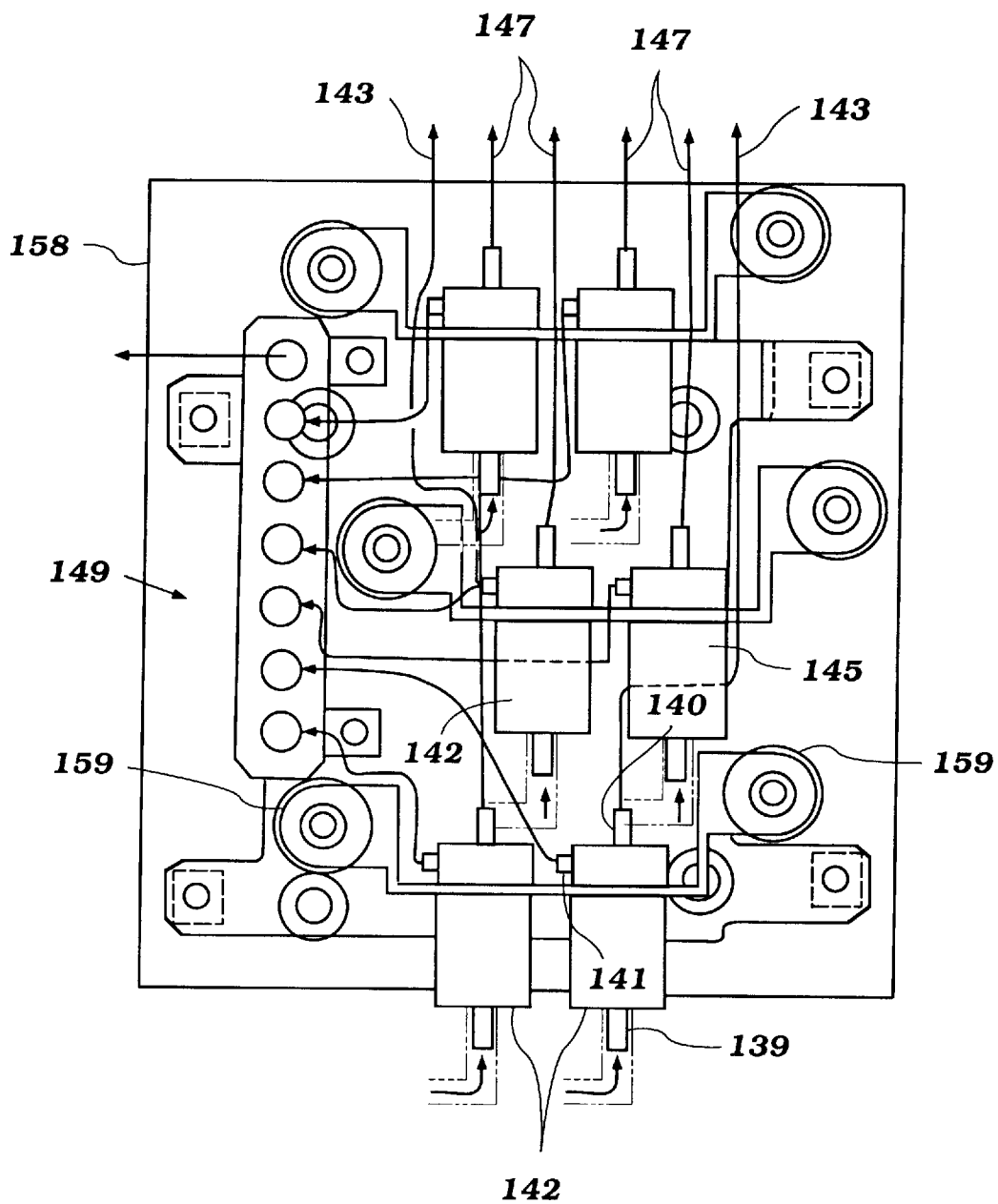
FIG. 7 is an enlarged partial view of the oil-return manifold and selector valves of the present invention.

Nipples 153 are connected at the return ports 141 of the selector valves by a plurality of individual return conduits 157, Return conduits 157 are preferably made of a rigid material in order to prevent leaking and wear. The oil-return manifold 149 and plurality of selector valves 134 are commonly mounted in close proximity to each other on a board 158 by shock absorbing fasteners 159. The board 158 is mounted to engine 51 as best seen in FIG. 7. The shock absorbing fasteners 159 help protect the elements mounted in the board 158 from engine vibrations. The close proximity between the selector valves 134 and the oil-return manifold 149 allow the return conduits 157 to be of a reduced length and rigid construction. Shorter rigid delivery conduits 157 reduce leaking and wear in the conduits.

The outlet nozzle 155 of the oil-return manifold 149 is connected to the oil tank 138 by an elastic conduit 160. Oil tank 138 supplies oil to oil pump 132 and is connected thereto by elastic conduit 161. An oil filter 162 is provided between oil tank 138 and oil pump 132. The oil pump 132 is operatively coupled to the balance shaft 98 in order to be driven by the balancer shaft 98.

An electrical control unit 163 receives electrical impulses from the flywheel assembly 13, described above. Electrical control unit 163 controls the metering of the oil supplied to the lubrication areas of the engine 51 or to the oil tank 138 through the selector valves 134.

The oil tank 138 is mounted to an arm (not shown) extending from the engine 51. The oil tank 138 is positioned relative to the engine 51 so as to be cooled by the atmospheric air brought into the engine compartment to cool the engine 51. The oil tank 138 is located so it will not be significantly heated by the heat generated by the engine 51. The oil tank 138 is mounted to the arm adjacent a fire wall of the automobile. The pumping and control means 137 is mounted to a side of the engine 51 closer to an end of the automobile on a passenger side of the automobile.

It should be readily apparent that the foregoing description is that of the preferred embodiments of the invention and various alternative embodiments may be employed. Of course, various other changes and modifications will present themselves to those skilled in the art and such changes and modifications are deemed to fall within the spirit and scope of the invention, as defined by the appended claims.

What is claimed is:

1. An oil-metering system for an internal combustion engine comprising an oil tank for supplying oil to the lubrication areas of said engine, a plurality of individual oil supply conduits for supplying oil to the lubrication areas, a plurality of pumping and control means for individually metering oil supplied by said oil tank, each of said plurality of pumping and control means supplying oil to specific ones of the lubrication areas or returning oil to said oil tank, a single oil-return manifold connected to all of said pumping and control means by a plurality of individual return conduits, said oil-return manifold and pumping and control means being commonly mounted in close proximity to each other reducing the length of said return conduits.

2. The oil-metering system of claim 1, wherein said pumping and control means and oil-return manifold are commonly mounted to said engine so as to reduce the length of said return conduits.

3. The oil-metering system of claim 1, wherein said pumping and control means is connected to said oil tank by an elastic conduit.

4. The oil-metering system of claim 3, wherein said oil-return manifold is connected to said oil tank by an elastic conduit.

5. The oil-metering system of claim 1, wherein said oil supply conduits include a first and second series, said first and second series connecting said pumping and control means to the different lubrication areas of said engine for delivering varying amounts of oil as required by the areas.

6. The oil-metering system of claim 5, wherein said engine includes an electromagnetic flywheel assembly, said flywheel assembly generates an electrical impulse corresponding to the speed of said engine, an electrical control unit receives the electrical impulse from said flywheel assembly and controls the metering of the oil in said pumping and control means.

7. The oil metering system of claim 1, wherein said pumping and control means includes a one-way valve.

8. An oil-metering system for an internal combustion engine comprising an oil tank for supplying oil to the lubrication areas of said engine, a plurality of individual oil supply conduits for supplying oil to the lubrication areas, a pumping and control means for individually metering oil supplied by said oil tank and supplying oil to the lubrication areas or returning oil to said oil tank, a single oil-return manifold connected to said pumping and control means by a plurality of individual return conduits, said oil-return manifold and pumping and control means being commonly mounted in close proximity to each other reducing the length of said return conduits, said pumping and control means and oil-return manifold being commonly mounted to said engine so as to reduce the length of said return conduits, said pumping and control means and oil-return manifold being commonly mounted to a board by shock-absorbing fasteners, said board is mounted to said engine.

9. The oil-metering system of claim 8, wherein said return conduit is constructed of a rigid material.

10. An oil-metering system for an internal combustion engine comprising an oil tank for supplying oil to the lubrication areas of said engine, a plurality of individual oil supply conduits for supplying oil to the lubrication areas, a pumping and control means for individually metering oil supplied by said oil tank and supplying oil to the lubrication areas or returning oil to said oil tank, a single oil-return manifold connected to said pumping and control means by a plurality of individual return conduits, said oil-return manifold and pumping and control means being commonly mounted in close proximity to each other reducing the length of said return conduits, said internal combustion engine being mounted in an automobile, said oil tank being positioned relative to said engine so as to be cooled by atmospheric air brought in to cool said engine and not heated by heat generated by said engine.

11. The oil-metering system of claim 10, wherein said pumping and control means and oil-return manifold are mounted to a side of the engine closer to an end of the automobile on a passenger side of said automobile.

12. The oil-metering system of claim 11, wherein said oil tank is mounted adjacent a fire wall of said automobile.

13. The oil-metering system of claim 12, wherein said engine includes a rotatably driven crankshaft and balancing shaft, a flywheel affixed to an end of said crankshaft, said balancing shaft mounted below said crankshaft, a starter motor operatively associated with said flywheel, said starter motor positioned between said balancing shaft and a closer end of said automobile at substantially the same height as said crankshaft.

14. An oil metering system for an internal combustion engine comprising an oil tank for supplying oil to the lubrication areas of said engine, a plurality of individual oil supply conduits for supplying oil to the lubrication areas, a pumping and control means for individually metering oil supplied by said oil tank and supplying oil to the lubrication areas or returning oil to said oil tank, a single oil-return manifold connected to said pumping and control means by a plurality of individual return conduits, said oil-return manifold and pumping and control means being commonly mounted in close proximity to each other reducing the length of said return conduits, said pumping and control means being connected to said oil tank by an elastic conduit, and an oil filter provided between said oil tank and said pumping and control means.

15. An oil-metering system for an internal combustion engine comprising an oil tank for supplying oil to the lubrication areas of said engine, a plurality of individual oil supply conduits for supplying oil to the lubrication areas, a pumping and control means for individually metering oil supplied by said oil tank and supplying oil to the lubrication areas or returning oil to said oil tank, a single oil-return manifold connected to said pumping and control means by a plurality of individual return conduits, said oil-return manifold and pumping and control means being commonly mounted in close proximity to each other reducing the length of said return conduits, said pumping and control means including an oil pump with a plurality of outlets, a plurality of selector valves connected to said plurality of outlets by a corresponding plurality of delivery conduits, said selector valves individually metering oil supplied by said oil tank and supplying oil to the lubrication areas or returning oil to said oil tank, said single oil-return manifold being connected to said plurality of selector valves.

16. The oil-metering system of claim 15, wherein said selector valves and oil-return manifold are commonly mounted to a board by shock-absorbing fasteners, a one-way valve is disposed between said oil pump and selector valves, said oil pump is connected to said oil tank by an elastic conduit, said oil-return manifold is connected to said oil tank by an elastic conduit.

17. The oil-metering system of claim 16, wherein said selector-valves and oil supply conduits include a first and second series, said first and second series connecting said pumping and control means to the different lubrication areas of said engine for delivering varying amounts of oil as required by the areas.

18. The oil-metering system of claim 17, wherein said internal combustion engine is mounted in an automobile, said oil tank positioned relative to said engine so as to be cooled by atmospheric air brought in to cool said engine and not heated by heat generated by said engine.

19. A starter engine arrangement for an internal combustion engine of an automobile comprising an engine with a rotatably driven crankshaft, a flywheel provided on an end of said crankshaft, a balancing shaft driven by said crankshaft and provided below said crankshaft, a starter motor operatively associated with said flywheel, said starter motor positioned relative to said engine so as to be cooled by atmospheric air brought in to cool said engine and easily accessible.

20. The starter engine arrangement of claim 19, wherein said starter motor is mounted to said engine between said balancing shaft and an end of said automobile close to said engine at substantially the same height as said crankshaft.

* * * * *